United States Patent
Hegar et al.

(10) Patent No.: US 11,638,044 B1
(45) Date of Patent: Apr. 25, 2023

(54) PREPARATION OF WARM INPUTS FOR DIGITAL CONTENT STREAMING

(71) Applicant: Amazon Technologies, Inc., Reno, NV (US)

(72) Inventors: Ryan Hegar, Happy Valley, OR (US); Matthew Rehrer, Nevada City, CA (US); John Saxton, Portland, OR (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 17/683,911

(22) Filed: Mar. 1, 2022

(51) Int. Cl.
*H04N 7/16* (2011.01)
*H04N 21/231* (2011.01)

(52) U.S. Cl.
CPC .............................. *H04N 21/23106* (2013.01)

(58) Field of Classification Search
CPC .............................................. H04N 21/23106
See application file for complete search history.

(56) References Cited

U.S. PATENT DOCUMENTS

| | | | |
|---|---|---|---|
| 2016/0164943 A1* | 6/2016 | Walker | H04L 65/70 709/219 |
| 2017/0236499 A1* | 8/2017 | Luo | G09G 5/395 345/547 |
| 2019/0149819 A1* | 5/2019 | Phillips | H04N 19/46 375/240.02 |
| 2020/0014988 A1* | 1/2020 | Navali | H04N 21/85406 |
| 2021/0314632 A1* | 10/2021 | De Decker | H04N 21/234 |

* cited by examiner

*Primary Examiner* — Mulugeta Mengesha
(74) *Attorney, Agent, or Firm* — Hogan Lovells US LLP

(57) ABSTRACT

Systems and methods, to efficiently prepare for live and stored file content, implement one or more warm inputs, which actively ingest and demux content, but do not actively decode the content until an input switch is commanded. Each warm input can cache a most recent instantaneous decoder refresh and subsequent reference frames (I-frames and P-frames). Upon an input switch being commanded, the subject input commences decoding of such preserved frames. The formerly-warm input then acts as a hot input (decoding every frame) until the input switch completes. The use of warm inputs, which avoid the decoding stage, reduces computational resource use, allows preparation of all inputs by default, and permits metrics, status reports, and thumbnails to be generated regarding non-active inputs.

20 Claims, 6 Drawing Sheets

PREPARATION OF WARM INPUTS FOR DIGITAL CONTENT STREAMING

BACKGROUND

As technology continues to advance and diversify, there is a corresponding need to provide video and/or audio content in an increasing variety of formats. For streaming video, this can entail live video transcoding, including that performed by the live video processing service AWS Elemental MediaLive offered by Amazon Web Services, Inc. ("AWS") or its affiliates. Broadcast-grade video processing services such as AWS Elemental MediaLive permit creation of high-quality video streams for delivery to broadcast televisions and internet-connected multiscreen devices, like connected televisions, tablets, smart phones, and set-top boxes. The service works by encoding live video streams in real-time, taking a larger-sized live video source and compressing it into smaller versions for distribution to viewers.

Such services need to prepare inputs before making them active. Preparing a live input currently uses a pipeline having four components: an input reader, a demultiplexer (also known as a "demux" or a "data distributor"), a decoder, and a "hot standby" consumer. An input reader can be responsible for fetching the necessary data. A demux is a circuit that can distribute or deliver multiple outputs from a single input; the demultiplexer can perform as a single input with many output switches. A decoder uncompresses or decompresses encoded content into its pre-compressed form. A hot standby consumer intelligently discards frames until the input becomes active. The decoding stage, in particular, is quite computing intensive. There thus is a need for the ability to perform, efficiently in terms of computing resources, a rapid content encoding input switch, to an input which is not currently the active, decoding one.

BRIEF DESCRIPTION OF THE DRAWINGS

Various embodiments in accordance with the present disclosure will be described with reference to the drawings, in which.

DETAILED DESCRIPTION

Figure 1:
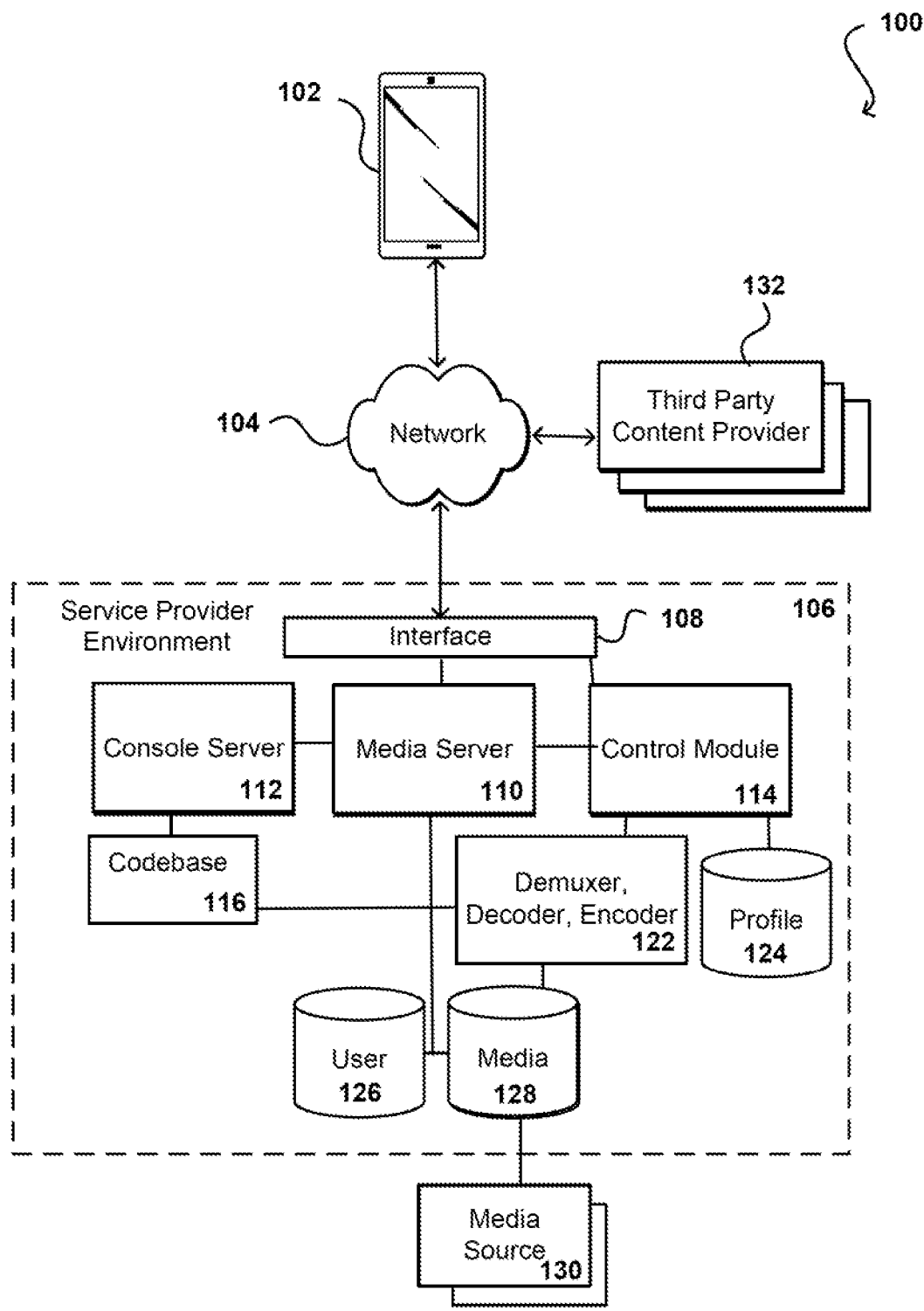
FIG. 1 illustrates an example resource environment where warm inputs can be prepared for streaming media content input, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Preparation of a content input, such as utilized by a streaming media service provider, entails ingesting the content and taking requisite action such that the content is available on short notice, requiring only a switch to the new input. Generally speaking, video encoding is performed on a single video pipeline, where a network input, does at least a portion of decoding, processes the video, and re-encodes it at different bit rates and resolutions, depending on any applicable configuration. Approaches described and suggested herein more efficiently preparing content inputs, including that for live video and/or audio, by utilization of "warm" inputs, as opposed to a "hot" input which is being actively decoded in preparation for a switch to that input. As used herein at least, a warm input is one which is actively ingested and demuxed, but isn't actively decoded.

In various embodiments, input reader activity can include setting up a socket to receive User Datagram Protocol ("UDP") input, connecting to a Real Time Messaging Protocol ("RTMP") server to receive RTMP input, or fetching Hypertext Transfer Protocol ("HTTP") Live Streaming ("HLS") data. Regardless of protocol, the input reader can be responsible for fetching compressed content from wherever stored. The demux is responsible for demultiplexing the obtained input content into its video and audio caption streams. The decoder, as the name indicates, decodes content, such as frames of video. The hot standby consumer may serve as a sort of monitoring piece that intelligently knows to which frame an input switch should go, discarding any frames, including a group of pictures ("GOP") that are essentially in the past, relative to where a user might want to switch. Ultimately, of course, an input switch will require decoded frames from the compressed input to be available, and the necessary frames may come in the middle of a sequence of a GOP.

Avoiding the decoding stage until an input is "hot," as per the present use of warm inputs, meets a need to considerably reduce the computation required to prepare live inputs, which are those inputs actively decoding content and passing the decoded content on for ultimate transmission to a client or other end-user. Another satisfied need is to reduce the central processing unit ("CPU") utilization required to do that input preparation. Once at least the tasks herein are accomplished, it then effectively becomes less expensive to prepare an input, and more (or even all) of a service provider's inputs for a given deployment can be prepared for a switch. As will be discussed, this yields further benefits, such as the ability to provide customers with previews of the inputs. Moreover, as the present systems and methods may maintain the most recent GOP from a previous instantaneous decoder refresh ("IDR") through whatever frame it is desired to switch, it is not necessary to decode every frame in that GOP; when the time comes for a desired switch, the service provider can automatically and intelligently skip decoding, or perform a partial decoding of some of the frames in that GOP.

For the avoidance of doubt, while the term "video" is frequently utilized herein, such is merely for convenience and readability, and the present warm input-based systems and methods may be applied on any sort of streaming content data, including audio, captioning, other metadata, and multiplexed data in single packets. For example, some illustrative embodiments can include a warm standby consumer for the audio data, and cache a predetermined amount of compressed audio, such as measured in seconds of time.

Further, the warm inputs disclosed herein can work with video-only streams which do not include any audio. Various other such functions and approaches can be used or performed as well within the scope of the various embodiments as would be apparent to one of ordinary skill in the art in light of the teachings and suggestions contained herein FIG. 1 depicts a high-level view of an example content delivery system resource environment 100, in which features and aspects of the various embodiments can be implemented. To be clear, all encoding and decoding-related components, and other resource instances, may be in "the cloud," edge machines, or on-premise machines, or any sort of combination thereof. In various embodiments, the environment 100 may include various types of electronic resources that can be utilized by multiple users for a variety of different purposes.

In this example, a client computing device 102 can submit a request for content, such as media, across at least one network 104 to be received by a content streaming service provider environment 106. This can include a request for specific content or a subscription to have content pushed to the client device 102, among other such options. In at least some embodiments the request can include a request for content to be displayed on, or presented via, the computing device 102, and in many cases will include video, audio, and/or other media content encoded for presentation by the client device 102.

The client computing device 102 can include any appropriate electronic device operable to send and receive requests, messages, or other such information over an appropriate network and convey information back to a user of the device. Examples of such client devices include personal computers, tablet computers, smart phones, laptop computers, notebook computers, and the like. The network(s) 104 can include any appropriate network, such as the internet, a local area network ("LAN"), a cellular network, an Ethernet, and/or other such wired and/or wireless network. The service provider environment 106 can include any appropriate components for receiving requests and returning information or performing actions in response to those requests. As an example, the provider environment might include Web servers and/or application servers for receiving and processing requests, then returning data, video, audio, Web pages, or other such content or information in response to the request. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation An interface layer 108 on the service provider end 106, in at least one embodiment, includes a scalable set of customer-facing servers that can provide the various Application Programming Interfaces ("APIs") and return the appropriate responses based on the API specifications. The interface layer 108 also can include at least one API service layer that in one embodiment consists of stateless, replicated servers which process the externally-facing customer APIs. The interface layer 108 can be responsible for Web service front-end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In this example, a request or call received by the content provider environment 106 can be received by an interface layer 108. As known for network environments, the interface layer 108 can include components such as interfaces (e.g., APIs), load balancers, request and/or data routers, and the like. The interface layer 108, when receiving a request or call, can determine the type of call or request and cause information to be forwarded to the appropriate component or sub-system. For example, a request for content might be forwarded to a media server 110, while a request to specify encoding parameters or generate an encoding profile might be forwarded to a console server 112 and/or a control module 114, among other such options. In some embodiments, the control module 114 is configured to oversee and control the input switch process, including issuance of switch commands. The calls or requests can also come from third parties, such as streaming content providers who utilize the resources of the content provider environment 106, and third party providers 132 can provide at least some of the media content to be stored to a media repository 128 and/or encoded for display on the client device 102 as discussed herein. Further, a different type of client device 102 can be used to providing encoding information than is used to consume encoded content.

If the request is a request for content, such as for a video data stream to be provided to the client device 102, information for the request can be directed to one or more media servers 110, which can obtain the content from the media data store 128 or other such repository or media source 130 (or data cache temporarily storing media from the media source) to be sent back across the network(s) 104 to the client device 102, which can be the device submitting the request or a device identified by the request, among other such options. The media source 130 can include one or more content servers and/or a source for file(s) to be fetched. In this example, media content (e.g., live video and audio) is captured, generated, or otherwise obtained by the media source 130, and this can include, for example, live video data captured by one or more cameras. In some embodiments, information for the request might also be compared against user data in a user data store 126 or other such location to determine, for example, whether the user has access rights to that content, and potentially the formats or versions to which the user has access rights.

In at least some embodiments a request from an operator, an administrator, a client device 102, a third party provider 132, or another such source might include a request to specify one or more sets of encoding parameters to be used with a media file. Accordingly, information regarding the encoding parameters can be provided to the control module 114, or other such component or service, that is able to receive the information through an appropriate interface (i.e., an API or console) and cause the profile and parameter data to be stored to at least one appropriate encoding profile repository 124. When a request for a video file is received, the control module 114 can use the profile and parameter data to determine the appropriate encoding information, and can pass that to one or more media demuxing, decoding, and/or encoding modules or components 122, such as may include encoding applications running on one or more allocated servers (physical or virtual), which can obtain the media file and encode the media file per the encoding information, which can then be provided to the client device by a media server 110 or other such component. For streaming media and other such content transmissions, various video encoding profiles or "presets" can be used that provide for granular control over the encoding parameters for the content to be transmitted. This level of control can require a complex, hierarchical, nested schema, along with an appropriate API or other such interface, that are compatible with the decoding and encoding system.

The demuxing, etc. component(s) 122 in this example can be implemented in hardware and/or software, and can be able to receive and process input; this may include, for example, Internet of Things ("IoT")-type functionality wherein the media encoder can receive these parameter values, perform processing or analysis, and execute the input switch processes and techniques herein. The demuxing, etc. component(s) 122 may include one or more transcoders which can concurrently perform transcoding of a source or primary input video stream into various output streams in different formats. The incoming video stream can be received and re-encoded, or transcoded, into one or more output formats, such as may be appropriate for, or supported by, potential recipient devices, systems, processes, components, or applications.

For any necessary encoding, there can be various input and output groups, which can correspond to a manifest or transport stream. Each output stream can include various types of components, such as a video component, an audio component, caption data, and metadata, among other such options. There can be settings used for the encoding of the output as a whole, as well as for the individual components. The general structure of the streams can be treated as a constant that does not change much over time, but the settings within each of those primitives can change from release to release.

As mentioned, there are situations where the content to be transmitted to the client computing device 102 corresponds to a live stream. As referred to herein, a "live" stream refers to a transmission of media content that is received by the content provider environment during a period of capture, such that each frame of media content is received shortly after it is captured, for near real-time representation of an occurrence or event. In one embodiment, the media server 110 can identify a given stream as a live stream, and can determine whether an existing stream output exists that has the proper encoding. This media data can be processed (i.e., encoded using appropriate encoding parameters) and then transmitted to the client computing device 102 for presentation with minimal latency, such as in near real time (i.e., less than a couple of seconds after the media data was initially captured). Approaches for capturing or displaying live broadcasts and streaming media are well known in the art and as such will not be discussed herein in detail.

In the sample system illustrated in FIG. 1, a core, static codebase 116 is provided as part of the dynamic architecture. The codebase 116 can be utilized by the console server 112, the encoding manager 114, or other such entity to provide support for new settings, media inputs, and encoders, among other such options (including determination of proper encoding settings for a content stream). Various other components can utilize the static codebase 116 as well within the scope of the various embodiments. Such an approach enables the service provider environment 106, or a media service provided using resources of the environment, to support an indefinite number of encoders, without need for a new console deployment.

The architecture can be written using any appropriate programming language, such as the open-source TypeScript programming language. Such a programming language can be used to provide an architecture which is declarative of all the settings and validations, etc. The static codebase 116 written in that programming language can generate an appropriate persistent object, such as a JavaScript Object Notation ("JSON") schema object, once the settings are determined and validated (or during such process). The JSON file can then be persisted to a location, such as the encoding profile data store 124, which the control module 114, encoders 122, or other components access in order to dynamically load as needed.

Figure 2:
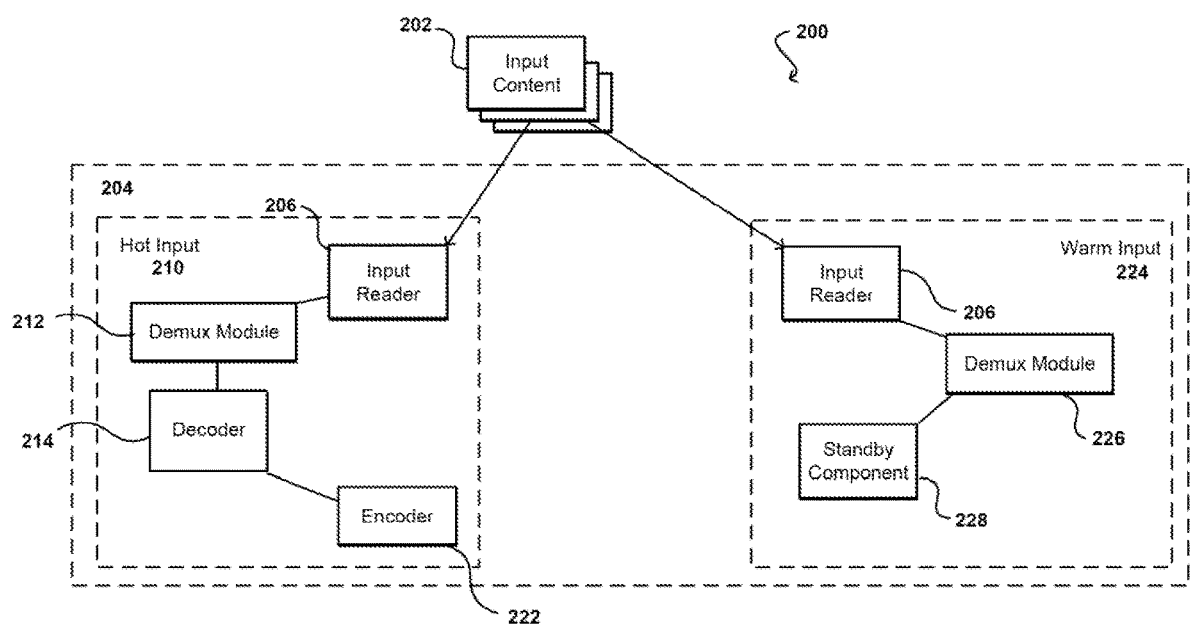
FIG. 2 illustrates an example environment in which various aspects of the present systems and methods can be implemented, in accordance with various embodiments.

FIG. 2 illustrates an overview of service provider components for an example system 200 that can be used to warm inputs in connection with transmission of media content. In this example, incoming input content 202, which may represent multiple different input files or input streams, may be provided to a service provider input processing environment 204 having one or more input readers 206. The content 202 may include media files, as noted above, which may include, but are not limited to, encoded video media files. In at least one embodiment, the content 202 may be uploaded and stored by the service provider and/or, in other embodiments, accessed via a link or pointer to a storage repository hosted by or controlled by a separate content provider. The content 202 may be provided on demand, such as upon request from the content provider to begin one or more transcoding operations, or may be processed responsive to one or more determinations or events, such as an update to an existing media file, a newly added media file to a particular repository, or the like.

Again, as used herein, a hot input is one which is actively decoding content, whereas a warm input is not engaged in decoding. A hot input 210 has a demux module 212, which may work with a variety of different demuxers and decoders 214. The hot input demux module 212, or multiple modules that may operate in parallel or at least in partially overlapping operations, may be utilized to split the media file into different elementary streams (e.g., audio, video, and subtitles) and further to extract key data (e.g., metadata) from the elementary streams. For example, frame data may be extracted from individual frames and include presentation time stamps, hashes of elementary stream data, frame types, frame duration, field counts, timecodes, data embedded into video elementary stream data, and other information. In various embodiments, frames are not fully decoded. Data extracted from each decodable frame may include the frame data. It should be appreciated that each decodable frame may be greater than or less than a number of demuxed frames.

In at least one embodiment, a hot input encoder 222 outputs encoded frames for storage or transmission to a user, such as one employing a client device. Each of the one or more warm inputs 224, in turn, will have its own warm input demux module 226 as part of the preparation herein; but a warm input 224 will not engage in any decoding until a point in time, in response to an input switch command, when that input 222 becomes a hot input 210. Prior to a switch, a standby component 228 may track a current point in the inputted content 202 that will be utilized if an input switch is ordered and intelligently discard unused portions of content, such as video frames not needed.

Figure 3:
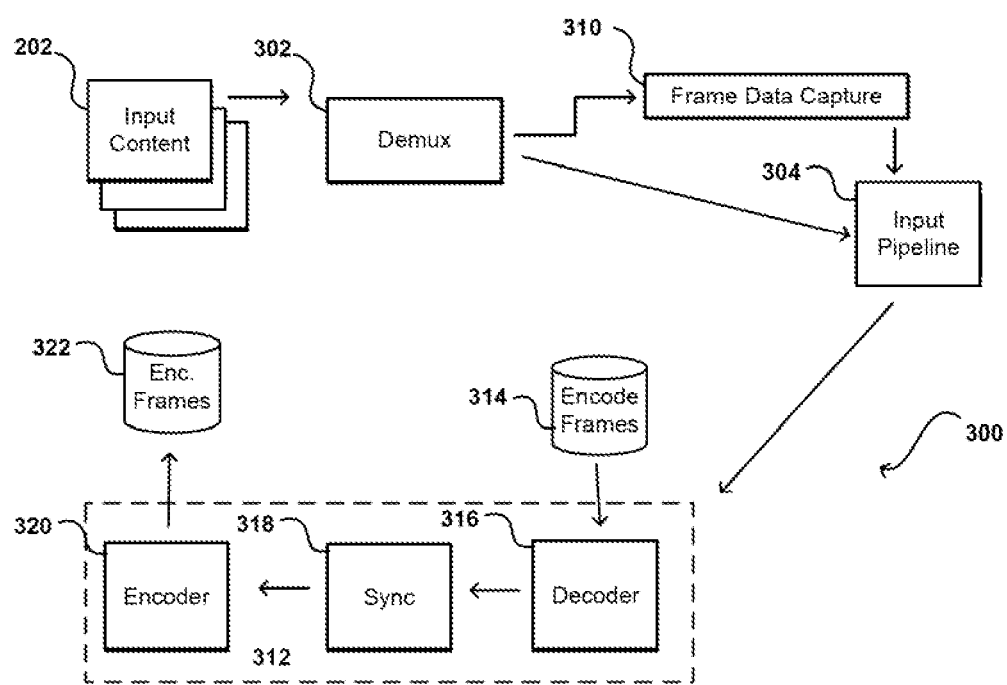
FIG. 3 illustrates representative components of a pipeline implementing certain content processing features of various embodiments.

FIG. 3 illustrates an overview of an example pipeline 300 that can be used in connection with one or more demuxing, decoding, and/or encoding procedures herein. In this example, one or more components or features may be shared with FIG. 2, where like numerals are used for convenience and not to limit the scope of the present disclosure. Here, the input content 202 is received at a demux module 302, which may form a portion of the modules 212 and/or 226. As noted, demuxing is associated with separating different parts of a media file into elementary streams, such as audio streams, video streams, and the like. An input pipeline 304 may receive the output of the demux module 302. For example, the input pipeline 304 may receive information that has a low likelihood of error or encoding problems or that a content provider has selected to go directly into the input pipeline 304. Additionally, in various embodiments, the input pipeline 304 may receive encoded portions that are not processed for extraction of metadata and/or receive portions of encoded frames for later processing.

In this example, output from the demux module 302 may follow along multiple different paths, such as to the input pipeline 304 or to a frame data capture module 310. In at least one embodiment, one or more software instructions executing on one or more processors may extract data from various frames of the content 302. The extracted information may be utilized separate from, and independent to, an uncompressed frame. In other words, the pseudo decode module 308 and a frame data capture module 310 may be used to extract metadata without processing or otherwise storing uncompressed frames, which may improve processing time as well as reduce storage requirements. The metadata, along with other information associated with processed frames, may then be stored within intermediate storage 216, but it should be appreciated that, in one or more embodiments, the intermediate storage 216 may be omitted or only receive portions of data.

In the illustrated embodiment, one or more processing components or modules 312 may fetch encoded frames from a data store 314. In the case of a hot (not warm) input, information is passed to a decoder 316 for decoding. Thereafter, the streams may be encoded 320 and then stored in an output data store 322.

Figure 4:
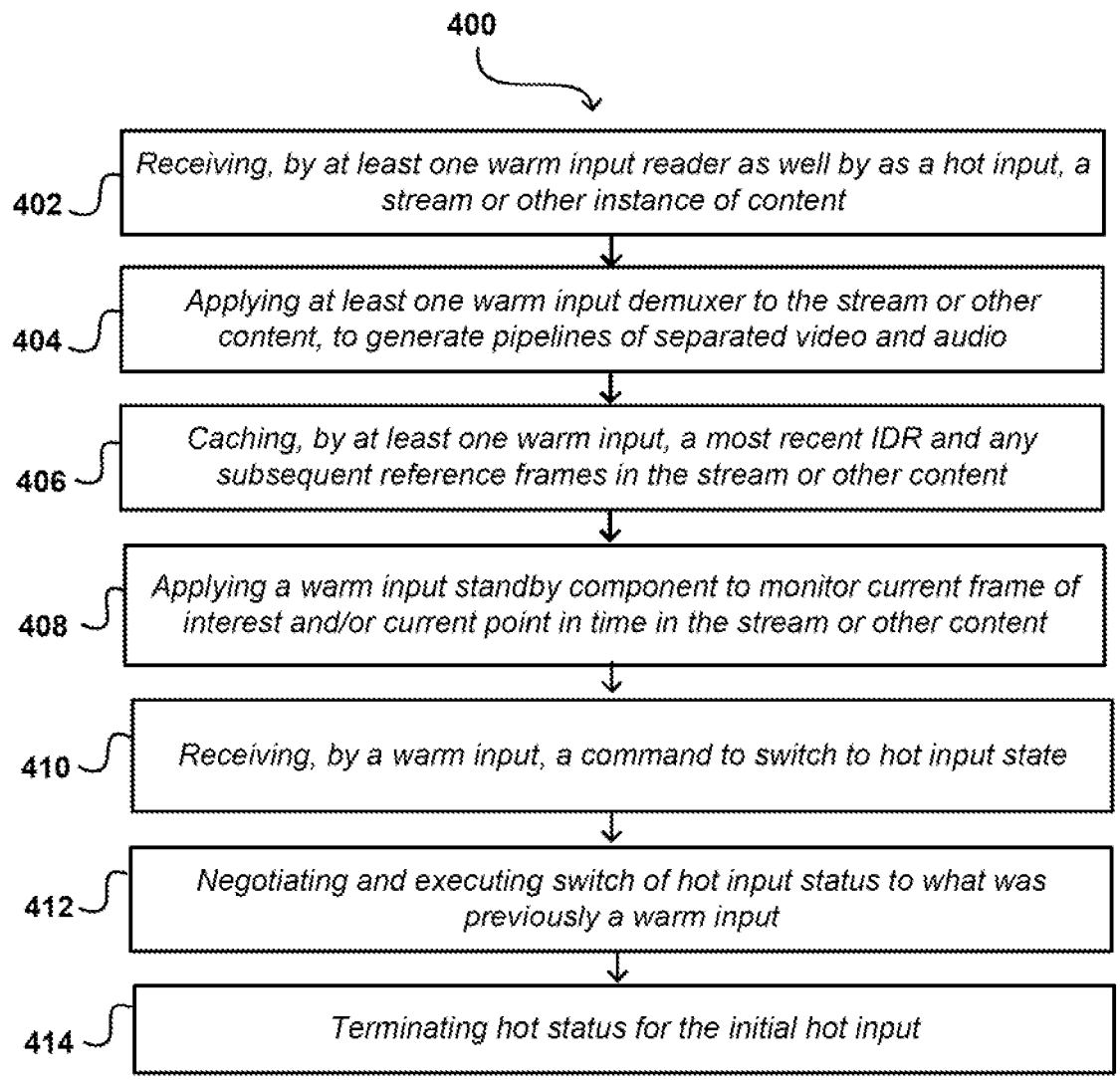
FIG. 4 illustrates representative steps an example process for preparing and implementing a warm input, in accordance with various embodiments.

Various illustrative embodiments include at least two options for the preparation of warm inputs, while eliminating unnecessary taxing computing resources. FIG. 4 illustrates an example first process 400 for preparing a warm input as discussed herein. The various process actions can be made dynamically and automatically in at least some embodiments. And it should be understood that for this, and other processes mentioned herein, that there can be additional, fewer, or alternative steps performed in similar or alternative orders, or at least partially in parallel, within the scope of the various embodiments unless otherwise specifically stated. Further, while this process 400 is described with respect to the specific example of video processing, it should be understood that various other types of data which can be compressed, encoded, and/or transmitted can benefit from use of such a process.

In particular, a representative first approach 400 uses a portion of input content, spanning the previous or immediately prior IDR up to the frame to be decoded, at which point the input switch will occur. With this scheme, the service provider can switch to any frame immediately as a result of possession of all required data, including, but not limited to, video frames.

The process 400 commences at step 402, where an incoming stream, or other instance of content, is received by a media or other input reader instance, associated with one or more service provider warm inputs. This warm input receipt is performed in parallel, and, in some embodiments, substantially simultaneously, with a service provider hot input receiving the stream or other instance of content. This received stream or other content can be encoded using a primary set of format parameters, such as may be determined based at least in part upon current network conditions and capabilities of networked encoders.

Example cases of input streams and/or other instances of input content include file inputs and live inputs. For a file input, the present systems will at least perform the steps of fetching the content file and demuxing, and have a selected first frame of video and audio ready for an input switch. Further processing stages may essentially be idle at that point, up to the point; nothing will be consumed from the file input until the time of the input switch. For live input content, an input reader and demuxer are still part of the configuration. Some sort of consumer, such as a "warm standby consumer" (as opposed to the hot standby consumer), will maintain, at any given time, a notion of what frame would be used if an input switch were commanded. In some embodiments, the warm standby consumer will keep the previous GOP, extending from to the previous IDR to a frame which would potentially be employed as part of an input switch; once a new IDR is received, the service provider systems and methods will then know that none of the pictures in that previously-saved GOP will be used, and that prior GOP will be discarded. Additionally, the warm inputs herein can assist with metadata processing, such as where a related system and/or method is configured to ingest SCTE-35 markers (e.g., advertising markers) from a warm input, rather than a hot standby input.

With the warm inputs hereunder, the service provider, as part of this input processor stage, can apply at least one input reader and at least one demuxer, at step 404, to respectively handle the content ingestion and pull the stream apart, into separate video and audio first-in, first-out ("FIFO") pipelines. The warm input, though, does not pass the content downstream to a decoder or a hot standby consumer—the data instead is maintained, in the pipelines, potentially for further processing prior to an input switch. Regarding the amount of memory required to cache many inputs, in at least some embodiments, the input reader will read ahead and cache some data, but will not read entire files into memory.

Detecting the condition and keeping the most recent n frames is viable. Further as to what a warm input would cache (such as with a video elementary stream) prior to becoming hot, the demuxer will take whatever comprises the input content, be it an mp4 file or HLS format. The demuxer will deconstruct or separate the input content and pull out the video elementary stream, meaning that compressed video frames is what will be cached and serve as a guide to the most recent content. Each warm input will cache, at step 406, the most recent IDR and all subsequent reference frames, the reference frames being "I-frames' and "P-frames" in some embodiments. As is known in the art, as "I-frame" is an intra-coded (complete) picture, while a "P-frame" makes for a predicted picture by only annotating changes from a previous frame. In this vein, in some embodiments, and as shown at step 408, a warm standby module can monitor a current frame and/or other point in time in the pipeline, in anticipation of an input switch.

As soon as an input switch request or command comes in, at step 410, the systems and/or methods will have one or more warm input(s) ready with all the video frames needed for decoding. As soon as the input switch is commanded, preferably with one second or more of pre-roll, the subject input's decoder will begin decoding preserved frames. From that point forward, the input receiving the command acts as a hot input (i.e., decoding every frame) until the input switch completes.

The amount of input switch pre-roll required in order to decode the pre-roll video frames will depend on the complexity of decoding the frames (codec, resolution, etc.) and the number of frames. Core pinning and/or thread priorities could help ensure that the catch-up decoding of the warm input reference frames occurs quickly, yet without interfering with the real-time processing of the active input. For example, a service provider can lower the thread priority of a decoder, to prevent the decoder from interfering with real time transcoding of the active input.

At step 412, a switch process may be negotiated, which, in some embodiments, involves one or more of grabbing needed network resources, configuring the applicable software stack, initiating any necessary applications, and starting the processing of content data as contemplated herein. As the system in various illustrative embodiments can be a live, running system, the versions of software executing on demuxing machines and the switched inputs can be restricted to stay within the compatible versions. Software compatibility and other analyses may assist in determining a suitable prepared switch point, where it will be possible to resume processing at a frame or other interest, which will be handled by the new hot input, without video player disruption. Some embodiments can be configured to ensure there is no sort of continuous mixing of versions between the inputs. Thus, in some embodiments, the decoders' and encoders' software stacks can be analyzed and updated as necessary.

In the interest of content stream continuity, the present systems and methods can be configured to ensure that service is not moved to the new hot input until certain video processing requirements are met. Such processing requirements may include context and cadence analyses of, for example, video state, frame segment number and cadence rate, and the like, as well as a time estimation of how long an input switch may take. When the input switch is executed and hot status is terminated (step 414) for what was previously the hot input, in some embodiments, a termination marker is not necessarily needed in the encoding stream.

A second approach or process for preparing a warm input is a simplification: essentially switching an input from warm to hot without preserving the most recent set of IDR and reference frames. Under this approach, the service provider systems and/or methods do not switch immediately, but rather fetch content via input readers and demux the content, while waiting for the next IDR when an input switch is desired; in this case, then, the next IDR's first frame would be the subject of the switch. This approach will take up to one IDR interval before the input is prepared. In some embodiments, there could be some lag between the moment that an input switch request comes in and the time that the next IDR is found, when the switch and decoding could commence. It is also possible that IDRs could come in seldomly in a given deployment. But, when the available input switch pre-roll is longer than the input IDR interval, there is no downside to this second approach. And this approach nevertheless improves any utilization of a "cold" or non-hot input (which otherwise is not input reading, fetching data, or otherwise preparing at all), and it is simpler in that the service provider need not cache any video frames, such as previous frames, and the provider need not put in any optimizations such as might involve skip paths and non-reference frames. This approach also avoids producing a spike in processing as a backlog of frames are decoded.

Regardless of approach and the number of warm inputs, there will not be more than two streams actively decoded at one time in nearly all cases: the active input and one warm input which is preparing for the switch. The time frame for decoding two inputs will be brief (typically on the order of a few seconds).

In the vein of differentiating content, the frequency of IDRs can vary. In one extreme, a given piece of content could comprise I-frame-only content, such that where every frame is an IDR; analyses hereunder is the easiest case, because the service provider will have cached the wanted frame and, upon deciding to switch the input, need only have to decode that one frame. On the other hand, content could have no IDRs, where every frame is, as is known in the art, a "progressive refresh" and includes a slice of what will be an integrated picture. In a progressive refresh setting using one or more of the present warm input approaches, the service provider will decode some number of frames before there is, effectively, a full picture. The number of frames can be a predetermined notion of how many frames back are necessary for maintenance. In other words, rather than maintaining from the previous IDR onward, the service provider will know how many pictures are in a refresh cycle and buffer that number of frames.

In the case of content in the MPEG-2 format, only I-frames and P-frames can serve as reference frames—not B-frames. If the service provider does not care about the decoded output of a B-frame, such frames can be discarded, without decoding and without concern over lost information which would prevent decoding of subsequent frames. For other content such as that in the H.264 format (Advanced Video Coding, also known as MPEG-4 Part 10), even B-frames can serve as reference frames, and other information stored in the bitstream will indicate whether a given frame is a reference frame or not.

As may be apparent, the various approaches hereunder have many benefits for content streaming service providers as well as their customers. The reduced CPU utilization when preparing live inputs will allow some channels, including infrequently-used automatic input failover ("AIF"), to run on smaller instances, reducing service cost and increasing profit margins. An AIF input consists of two inputs receiving content simultaneously and, using bits which are redundant, switches from one input to the other can be performed for robustness. When AIF failover mode is in use, both AIF inputs will need to be hot decoded. This is an exception to the notion that only two streams need to be actively decoded at one time; in this case, the number of streams is three. In addition, certain failover modes may have the capability to declare an input bad, if the decoder outputs only black-screen video for some duration of time; with a warm input, a provider won't know whether an input suffers such output, so an exception can be made should a customer request failover based on a freeze frame or the like, and switch made, based on hot decoding, instead of warm decoding input preparation.

Due to the decreased CPU load, a service provider or other user will be able to automatically and perpetually prepare all inputs by default, enabling a reduction in default channel schedule input switch pre-roll latency. The preparation of inputs by default can, in turn, simplify design of features which depend on pulling information from inactive inputs (like the SCTE 35 advertising insertion standard). In addition, the systems and methods hereunder have the ability, at a low CPU cost, to yield metrics, statuses, and thumbnails for each input, including those which aren't yet active.

To prepare a new warm input instance, the network resources may be deemed "belonging" to a given encoding job and associated Internet Protocol ("IP") addresses. It is also possible to add secondary IP addresses or another alternate communication path, involving automated negotiation with the user endpoint sending content such that it gets a new IP address, to reduce network packet dropping. MediaLive, for example, has a feature where, instead of giving a fully-qualified Uniform Resource Locator ("URL") for an input, one or more variables may present be in the string, where those variables are updated and substituted at runtime. Various illustrative embodiments herein can support file inputs with these dynamic URLs, as the service provider desires to efficiently prepare all inputs, but may not know the full associated URLs when a channel starts. In the context of the present systems and methods, this means the provider can be flexible enough to dynamically add or remove inputs to the warm input preparation list as customers update inputs at runtime. Specifically, as input switch channel schedule actions (which specify URLs) are added, they can be immediately processed.

Perpetually preparing all inputs gives the service providers an ability to generate, and potentially provide customers with, data and status reports on the presence and "health" of inactive inputs. By way of but one example, one or more API extensions can be configured to generate such status data, particularly in light of marketing input as to what information will be most valuable to customers. Representative status data might include the following: for all inputs, media information (framerate, resolution, audio/video codecs, captions availability, etc.), and thumbnails as to input states (e.g., no status, inaccessible, ready, or active). A "no status" could represent a lack of status, such as for an input to which connection has not yet been attempted. An "inaccessible" input might mean that a system and/or method hereunder is attempting to ingest the input, but is unable (e.g., an input loss for live inputs or a "not found" error, such as a 404 error, for files). "Ready" status would then indicate that a given system and/or method is ready to switch to the applicable input, while an "active" input, as the name indicates, would be the currently-active input. Specifically as to live inputs, generated metrics could concern bitrate, error seconds, packet loss, etc. File-based inputs could benefit from a file duration metric, as but one example.

In some embodiments, it will be possible to apply machine learning neural network techniques, including the use of confidence scores, to perform tasks hereunder, including, for example, optimizing the selection or preparation of the warm inputs. The processes herein are fairly deterministic in some embodiments, but one or more trained algorithms may consider when a service provider may, say, expect the next IDR to arrive in a content stream or file. Additionally, or alternatively, the provider might use machine learning schema on decoded video content to detect one or more anomalies to indicate that an input switch should be commanded. In some embodiments, machine learning may be used to attempt to infer an optimal set of parameters based on current network conditions; in some embodiments, machine learning may also be used to predict optimal settings based upon changing network conditions, or anticipated recipient changes, among other such options, such that the changes are more proactive than reactive, which can provide at least some advantage in video quality and may reduce a presence of dropped frames or other such issues. As is known in the neural network and artificial intelligence arts, a variety of neural network types could be applied by the service operator, including, but by no means limited to, feedforward, recurrent, radial basis function, modular, and self-organizing neural networks.

Figure 5:
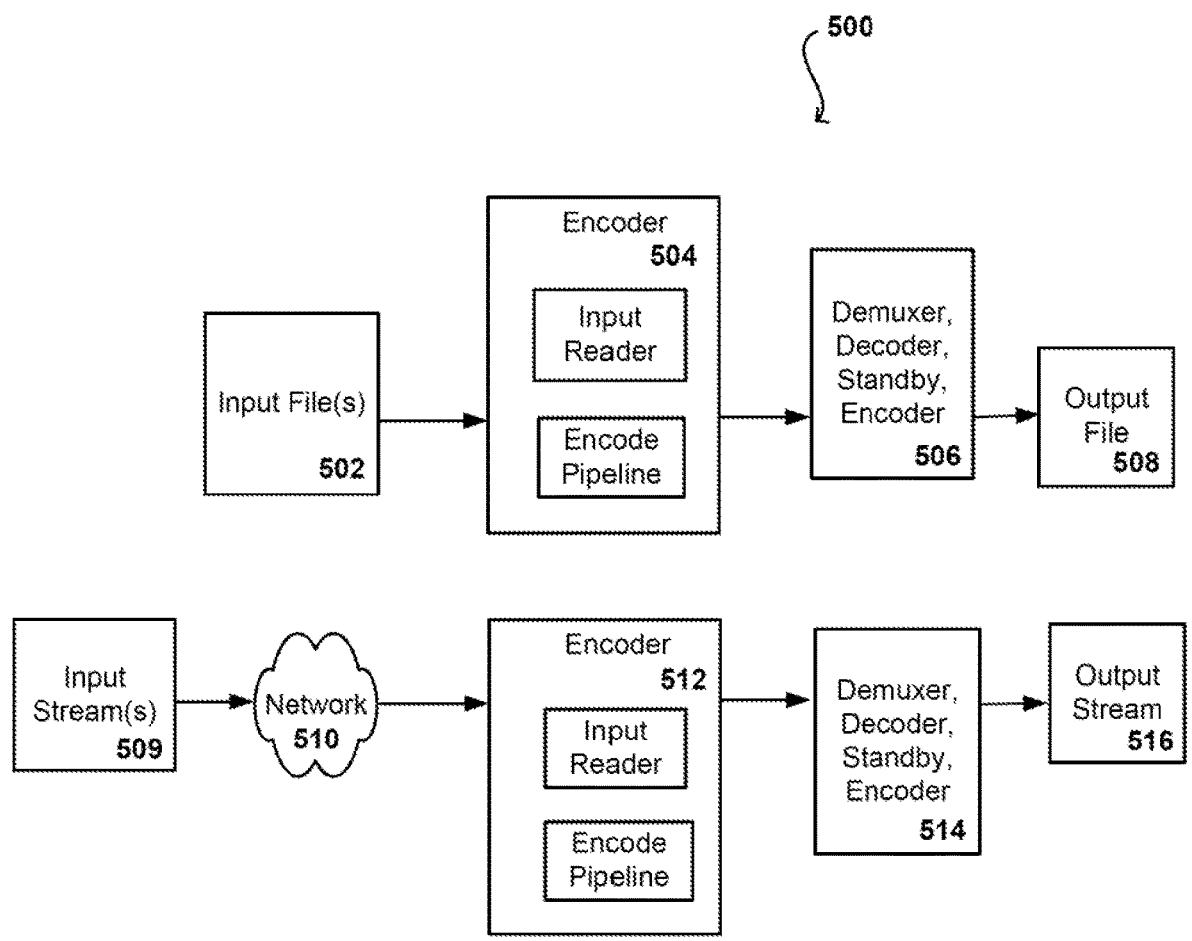
FIG. 5 illustrates an example encoder resource environment in which aspects of various embodiments can be implemented.

In some embodiments, the encoding subsystem includes one or more encoders, a set of bitstreams (or video signals), and a content delivery network ("CDN") or other content delivery system or service, as may include CloudFront from Amazon.com, Inc. Various encoders 504, 512 are illustrated in the example configuration 500 of FIG. 5. The one or more encoders can include both encoders and packagers, which can be implemented via an origin server. In at least some embodiments, the encoder hardware may determine or obtain current conditions, such as network conditions, and automatically modify the parameter values based upon those conditions, such as a currently-available bandwidth.

A packager can receive a signal (e.g., feed), such as a video signal, a media input file 502, or a live stream 509 over at least one network 510. In this example, there is an encoder 504 for the input media files 502 and an encoder 512 for the input streams 509, with each having respective demuxing, decoding, hot or warm standby, and encoding capability 506, 514 for generating the output file 508 or output stream 516. The encoders 504, 512 may be able to provide a video feed at various video format parameter values, such as 4K resolution, 60 fps framerate, and 10-bit color depth. A live stream feed may comprise live video content (sporting events, concert events, online gaming, pay-per-view events, etc.), pre-recorded content (television shows, movies, time-delayed events, sports highlights, etc.), and/or advertisement content (e.g., commercials), among others. The packager may receive one or more input signals (e.g., input) and generate one or more bitstreams. The output bitstreams can be delivered by an encoder/packager to the CDN.

Figure 6:
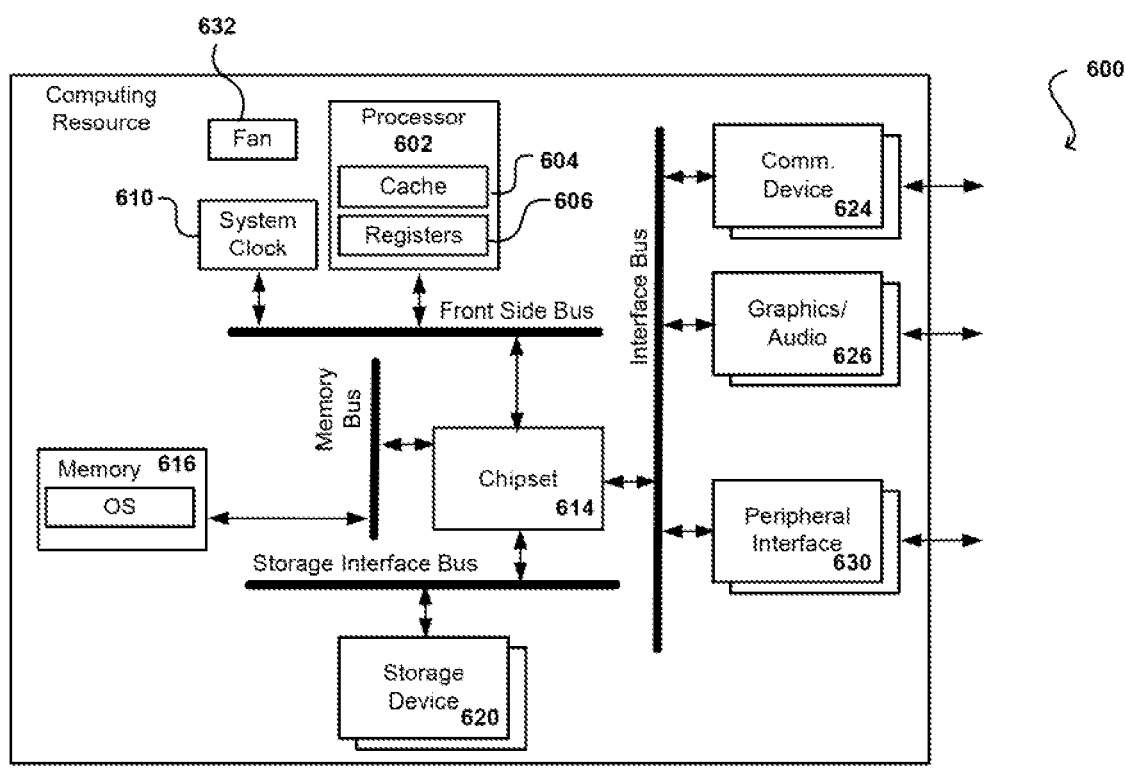
FIG. 6 illustrates example components of a computing device that can be used to implement aspects of various embodiments.

Computing resources used herein, such as servers and/or personal computers, will generally include at least a set of standard components configured for general purpose operation, although various proprietary components and configurations can be used as well within the scope of the various embodiments. FIG. 6 illustrates components of an example computing resource 600 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 600 (e.g., a desktop or network server) will have one or more processors 602, such as central processing units ("CPUs"), graphics processing units ("GPUs"), and the like, that are electronically and/or communicatively coupled with various components using various buses, traces, and other such mechanisms. A processor 602 can include memory registers 606 and cache memory 604 for holding instructions, data, and the like. In this example, a chipset 614, which can include a northbridge and southbridge in some embodiments, can work with the various system buses to connect the processor 602 to components such as system memory 616, in the form or physical RAM or ROM, which can include the code for the operating system as well as various other instructions and data utilized for operation of the computing device. The computing device can also contain, or communicate with, one or more storage devices 620, such as hard drives, flash drives, optical storage, and the like, for persisting data and instructions similar, or in addition to, those stored in the processor and memory. The processor 602 can also communicate with various other components via the chipset 614 and an interface bus (or graphics bus, etc.), where those components can include communications devices 624 such as cellular modems or network cards, media components 626, such as graphics cards and audio components, and peripheral interfaces 630 for connecting peripheral devices, such as printers, keyboards, and the like. At least one cooling fan 632 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 602 can obtain data from physical memory 616, such as a dynamic random access memory ("DRAM") module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 604 in at least some embodiments. The computing device 600 can also support multiple I/O devices using a set of I/O controllers connected via an I/O bus. There may be I/O controllers to support respective types of I/O devices, such as a universal serial bus ("USB") device, data storage (e.g., flash or disk storage), a network card, a peripheral component interconnect express ("PCIe") card or interface 630, a communication device 624, a graphics or audio card 626, and a direct memory access ("DMA") card, among other such options. In some embodiments, components such as the processor, controllers, and caches can be configured on a single card, board, or chip (i.e., a system-on-chip implementation), while in other embodiments at least some of the components may be located in different locations, etc.

An operating system ("OS") running on the processor 602 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect ("PCI") or small computer system interface ("SCSI") communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit ("GPGPU")). In such cases, the CPU may interface with one or more I/O devices. In some cases, these I/O devices may be special-purpose hardware designed to perform a specific role. For example, an Ethernet network interface controller ("NIC") may be implemented as an application specific integrated circuit ("ASIC") comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device, while the I/O adapter device is internally integrated into the host device in some embodiments. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment ("PXE") boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk ("DVD") or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
  receiving, by an input reader of a warm input, live media content;

dividing the live media content, by application of at least one demuxer of the warm input, into at least one elementary video stream and at least one elementary audio stream;

generating, by the warm input, a cache including a most recent instantaneous decoder refresh ("IDR") and subsequent audio in the at least one elementary audio stream and subsequent video reference frames in the at least one elementary video stream, the subsequent video reference frames including at least one of an I-frame or a P-frame;

maintain, by application of at least one hot standby component, a most recent group of pictures ("GOP") in the live media content;

determining, by application of a warm standby component to the cache, a current frame of interest in the most recent GOP;

receiving, by the warm input, a command to switch to a hot state input;

decoding, by the hot state input and commencing at the current frame of interest, the cache; and causing, from the current frame of interest and subsequent frames or audio downstream in the live media content, the decoded cache to be provided, as a stream having one or more packages, to a client computing device by at least one content delivery network ("CDN").

2. The computer-implemented method of claim 1, wherein the warm input fetches data using one or more of a socket to receive User Datagram Protocol ("UDP") input or a Real Time Messaging Protocol ("RTMP") server connection.

3. The computer-implemented method of claim 1, further comprising:
generating, by at least one of the warm input or a control module, one or more of metrics or a state report regarding a non-active input status.

4. The computer-implemented method of claim 1, wherein the cache is stored in a first-in, first-out ("FIFO") input processing pipeline.

5. The computer-implemented method of claim 1, wherein the warm input is addressed using at least one dynamic Uniform Resource Locator ("URL").

6. A computer-implemented method, comprising:
receiving, by an input reader of a warm input, media content;

dividing the media content, by application of at least one demuxer of the warm input, into at least one elementary video stream;

generating, by the warm input, a cache including a most recent instantaneous decoder refresh ("IDR") and subsequent video reference frames in the at least one elementary video stream;

applying a standby component to the cache to determine a current point of interest in the media content;

receiving, by the warm input, a command to switch to a hot state input;

decoding, by the hot state input and commencing at the current point of interest, the cache; and causing, from the current point of interest and subsequent frames or audio downstream in the media content the decoded cache to be provided to a client device by at least one media delivery channel.

7. The computer-implemented method of claim 6, wherein the cache includes one or more of an I-frame, a P-frame, or a B-frame.

8. The computer-implemented method of claim 6, wherein the input reader is configured to fetch at least one of User Datagram Protocol ("UDP") data, Real Time Messaging Protocol ("RTMP") data, or HTTP Live Streaming ("HLS") data.

9. The computer-implemented method of claim 6, wherein the method is implemented across one or more cloud-based networks.

10. The computer-implemented method of claim 6, wherein, following the command, the hot state input decodes each subsequent frame in the media content until completion of an input switch task.

11. The computer-implemented method of claim 6, wherein the media content is a live stream including video data and audio data.

12. The computer-implemented method of claim 6, further comprising:
training at least one neural network using a data set, the data set including information associated with streaming media; and
applying the at least one neural network to infer, based at least in part on a statistical model and one or more confidence scores, when a next IDR will arrive in the media content or a present of an anomaly in the media content.

13. The computer-implemented method of claim 6, wherein the media content is an audio-only stream or file.

14. A content streaming system, comprising:
a warm input;
a control module;
at least one processor; and
memory including instructions that, when executed by the at least one processor, cause the system to:
receive, by an input reader of the warm input, media content;
divide the media content, by application of at least one demuxer of the warm input, into at least one elementary video stream;
generate, by the warm input, a cache including a most recent instantaneous decoder refresh ("IDR") and subsequent video reference frames in the at least one elementary video stream;
apply a standby component to the cache to determine a current point of interest in the media content;
receive, by the warm input, a command, from the control module, to switch to a hot state input;
decode, by the hot state input and commencing at the current point of interest, the cache; and
cause the decoded cache to be provided to a client device by at least one media delivery channel.

15. The content streaming system of claim 14, wherein the input reader is configured to fetch at least one of User Datagram Protocol ("UDP") data, Real Time Messaging Protocol ("RTMP") data, or HTTP Live Streaming ("HLS") data.

16. The content streaming system of claim 14, wherein, following the command, the hot state input decodes each subsequent frame in the media content until completion of an input switch task.

17. The content streaming system of claim 14, wherein the hot state input decodes the media content on a progressive refresh basis.

18. The content streaming system of claim 14, wherein at least one of the control module or the warm input is configured to generate one or more metrics regarding a state of a non-live input in the content streaming system.

19. The content streaming system of claim 14, wherein the at least one media channel is a content delivery network ("CDN").

20. The content streaming system of claim 14, wherein the media content is one of a live media stream, including video data and audio data, or a stored file including video data and audio data.

* * * * *